United States Patent
Reed et al.

(10) Patent No.: US 6,716,275 B1
(45) Date of Patent: Apr. 6, 2004

(54) GAS IMPERMEABLE GLAZE FOR SEALING A POROUS CERAMIC SURFACE

(75) Inventors: Scott T. Reed, Albuquerque, NM (US); Ronald G. Stone, Albuquerque, NM (US); Tina M. Nenoff, Albuquerque, NM (US); Daniel E. Trudell, Albuquerque, NM (US); Steven G. Thoma, Albuquerque, NM (US)

(73) Assignee: Sandia Corporation, Albuquerque, NM (US)

(*) Notice: Subject to any disclaimer, the term of this patent is extended or adjusted under 35 U.S.C. 154(b) by 116 days.

(21) Appl. No.: 10/014,995

(22) Filed: Dec. 11, 2001

(51) Int. Cl.[7] .................. B01D 69/04; B01D 71/04
(52) U.S. Cl. .................. 96/10; 96/11; 55/524; 55/DIG. 5; 210/510.1
(58) Field of Search .................. 55/523, 524, DIG. 5; 96/4, 10, 11; 210/323.2, 510.1

(56) References Cited

U.S. PATENT DOCUMENTS

| | | | |
|---|---|---|---|
| 3,414,394 A | * 12/1968 | Poad | 65/17.5 |
| 4,902,314 A | * 2/1990 | Mizukami et al. | 95/285 |
| 4,968,467 A | * 11/1990 | Zievers | 264/621 |
| 4,983,423 A | 1/1991 | Goldsmith | 427/230 |
| 5,021,388 A | 6/1991 | Fridez et al. | 502/261 |
| 5,071,457 A | * 12/1991 | Schmidt et al. | 264/637 |
| 5,139,191 A | 8/1992 | Velterop | 228/122 |
| 5,196,007 A | 3/1993 | Ellman et al. | 55/523 |
| 5,238,478 A | * 8/1993 | Zievers et al. | 55/523 |
| 5,460,637 A | * 10/1995 | Connolly et al. | 55/487 |
| 5,500,029 A | * 3/1996 | Zievers et al. | 55/485 |
| 5,518,530 A | * 5/1996 | Sakai et al. | 96/11 |
| 5,611,931 A | 3/1997 | Liu et al. | 210/653 |
| 5,985,473 A | 11/1999 | Knapp | 428/702 |
| 6,113,664 A | * 9/2000 | Zievers et al. | 55/523 |
| 6,210,458 B1 | * 4/2001 | Shindo et al. | 55/486 |
| 6,231,642 B1 | * 5/2001 | Shelby et al. | 95/45 |
| 6,247,221 B1 | 6/2001 | Ritland et al. | |

* cited by examiner

Primary Examiner—Robert H. Spitzer
(74) Attorney, Agent, or Firm—Robert D. Watson

(57) ABSTRACT

A process for fabricating a gas impermeable seal on a porous ceramic surface using a thin, glass-based, pinhole free glaze. The process can be used to fabricate gas impermeable end seals on porous alumina tubes used as filter media. The porous alumina tubes can have an inorganic microporous thin film separation membrane on the inner surface, which can be used for high temperature gas separation processes.

28 Claims, 4 Drawing Sheets

GAS IMPERMEABLE GLAZE FOR SEALING A POROUS CERAMIC SURFACE

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

The present invention relates generally to materials and methods for glazing and sealing a porous ceramic surface. In particular, the invention relates to a glass-based glaze capable of sealing the ends of a porous alumina ($Al_2O_3$) ceramic filter tube. This "membrane-support" tube provides mechanical support for a thin film microporous membrane, which is used to separate hydrocarbon gases at high temperatures. The gas impermeable end seal is used to prevent gas from leaking around the ends during gas separation or other filtration processes.

Porous ceramic filter media are widely used in chemical processing applications, including liquid phase separations, solid/liquid separations, gas separations, contamination control, and membrane reactor applications. Filter media made of ceramics are generally superior to organic or metallic filter media because of their high temperature stability and inherent resistance to chemical attack. The media can take many geometric forms, such as open or closed-end tubes, plates, cylinders, discs, etc.

Microporous thin film membranes are used in chemical and petroleum refining processes for separating mixtures of gases by size exclusion (i.e., molecular sieves), such as separating various vaporized organic hydrocarbon isomers in a feedstock stream, or separating individual light gas molecules in stream. Amorphous silicon (e.g., solgel) membranes can be used for low temperature gas separations. The membrane's porosity is highly controlled in order to achieve a high flux and high separation efficiency. Microporous membranes are typically deposited or crystallized on a macro-porous mechanical support structure, such as on the inside of a macro-porous alumina tube (hereinafter referred to as "porous alumina", without the modifier "macro", for convenience.

A gas impervious surface is needed on the ends of the porous ceramic tube to lock the membranes into the flow-stream and to prevent the feed gas from bypassing around (i.e., short-circuiting) the internal microporous membrane, which would degrade the overall separation efficiency. At low temperatures, organic materials can be used to seal the porous surface, such as silicone, epoxy, acrylic, or other polymers. However, these organic materials are unsuitable for use at high temperatures, such as >200 C, at which point they decompose.

High temperature metallic braze alloys that wet ceramics can be used to seal the porous surface. However, high differential thermal stresses can be generated in the ceramic filter due to the large mismatch in the coefficient of thermal expansion (CTE) between the braze alloy (high CTE) and the ceramic (low CTE), leading to cracking and loss of sealing ability.

Commercially available ceramic glazes can be used to make the gas impermeable surface around the edges or ends of a porous ceramic filter. The ceramic glaze can withstand higher temperatures than organic sealants. The ceramic glazes generally have a closer CTE match to the ceramic filter media than metals, which reduces thermal mismatch stresses. However, commercially available glazes typically include low melting point compositions of mixed oxides, for example, $Na_2O$, $K_2O$, PbO, and CaO. Use of these mixed oxides makes them unsuitable for use at high temperatures (e.g., 500 C). Also, undesirable elements in these low-temperature ceramic glazes can disassociate and/or diffuse out from the glaze during the subsequent process of depositing or synthesizing the inorganic thin film microporous membrane (e.g., an inorganic zeolite membrane, which is deposited at from 90–200 C). These undesirable elements (or compounds) can interfere with the deposition/synthesis process, poison the membrane, and/or create defects in the microporous structure. These types of glazes also have a lower chemical resistance, which could partially dissolve in the high pH zeolite crystal-growing bath (the high temperatures used to grow the zeolites would increase the dissolution rate also).

The gas impermeable glaze preferably should be applied prior to growing the thin zeolite film. Because zeolite crystallization generally occurs under basic conditions, at high temperature, and sometimes with organic solvents, the glaze needs to be chemically stable. The glaze should not dissolve and become part of the reaction mixture during zeolite growth, which would interfere with crystal growth rates and affect the zeolite crystal's pore size. Since synthesis of zeolite films can be performed at temperatures as high as 200 C, the glaze should be stable at temperatures greater than 200 C (and, preferably, greater than 500 C for use in hydrocarbon gas separation processes). The glazed coating needs to be sufficiently strong to permit the use of gas-tight, metallic compression-type seals to be made (e.g., Swagelock™ type compression fittings) to the glaze. The glazed coating should be relatively thin, but not so thin as to crack or not provide a 100% "pinhole" free (i.e., <3 Angstroms) hermetic seal.

A need remains, therefore, for a material and method for glazing and sealing the edges or ends of a porous surface, such as a ceramic filter media, with a material that is gas impervious, can withstand high temperatures, is chemically stable, mechanically strong, relatively thin, and can be applied prior to synthesizing inorganic thin film separation membrane, such as zeolite-based microporous membranes.

Against this background, the present invention was developed.

BRIEF DESCRIPTION OF THE DRAWINGS

The accompanying drawings, which are incorporated in and form part of the specification, illustrate various examples of the present invention and, together with the detailed description, serve to explain the principles of the invention.

SUMMARY OF THE INVENTION

The present invention relates to a process for fabricating a gas impermeable seal on a porous ceramic surface using a thin, glass-based, pinhole free glaze. The process can be used to fabricate gas impermeable end seals on porous alumina tubes used as filter media. The porous alumina tubes can have an inorganic microporous thin film separation membrane on the inner surface, which can be used for high temperature gas separation processes.

DETAILED DESCRIPTION OF THE INVENTION

The present invention relates generally to materials and methods for glazing porous ceramic surfaces. In particular, the invention relates to a glass-based glaze capable of sealing the ends of a porous alumina ($Al_2O_3$) ceramic filter tube that provides mechanical support for a thin film microporous membrane, which is used to separate hydrocarbon gases at high temperatures. The gas impermeable end seal is used to prevent gas from leaking around the ends during gas separation or other filtration processes.

In the following discussion, reference to a "gas" stream is defined herein to include mixtures of gases, fluids other than gas, including, but not limited to, liquids, mixtures of different liquids, mixtures of liquids and solid particles, liquids with entrained gases, mixtures of gases and solid particles, and any combination thereof.

Figure 1:
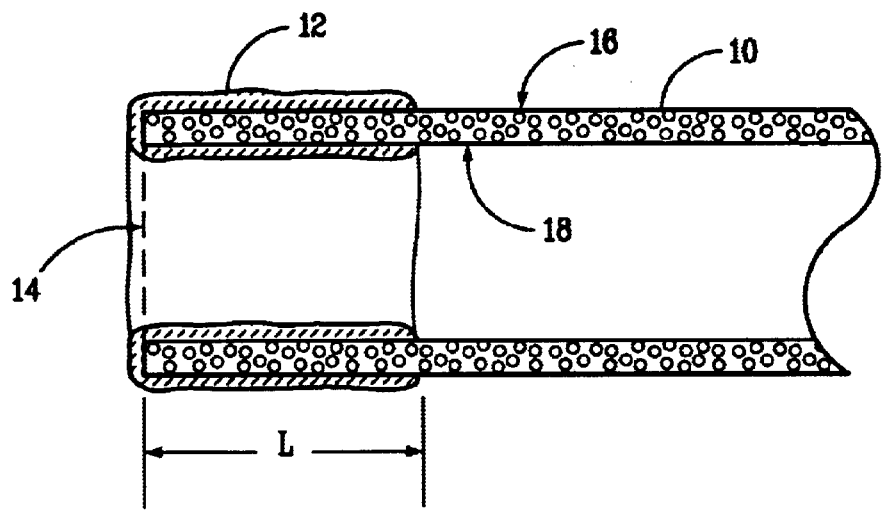
FIG. 1 illustrates a schematic cross-section view of an example of a porous ceramic tube with a glass-based glaze end seal, according to the present invention.

FIG. 1 illustrates a schematic cross-section view of an example of a porous ceramic tube with a glass-based glaze end seal, according to the present invention. Porous ceramic tube 10 has a continuous, gas impermeable glaze 12 disposed on at least one of its ends. Glaze 12 covers a length=L of the outer surface 16 of tube 10, the end 14 of tube 10, and a length=L of the inner surface 18 of tube 10.

Porous ceramic tube 10 can be made of a variety of ceramic materials, including, but not limited to, high-purity alumina, alpha-alumina, gamma-alumina, industrial grade alumina, cordierite, mullite, silica, spinel, zirconia, zirconium oxide, silicon carbide, beryllium oxide, silicon nitride, graphite, and other refractory oxides. The pores in tube 10 can have a uniform size throughout the wall thickness, or can have a gradation in pore size across the wall. Porous tube 10 can be made of alpha-alumina, having an average pore size of 1–2 microns, and an average porosity of about 35%. Tubes of this type are manufactured by US Filter, Inc. Alpha-alumina tubes can be made having much smaller pores, e.g., 50 angstroms.

Figure 2:
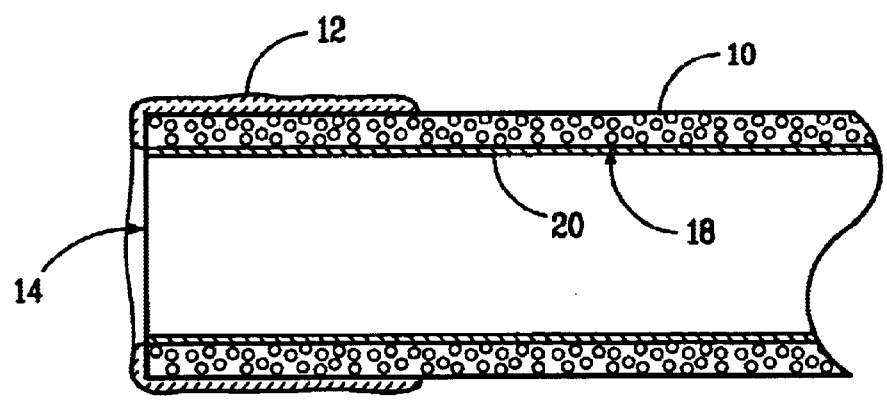
FIG. 2 illustrates a schematic cross-section view of an example of a porous ceramic tube with an internal microporous separation membrane, and with a glass-based glaze end seal, according to the present invention.

FIG. 2 illustrates a schematic cross-section view of another example of a porous ceramic tube with a microporous separation membrane, and with a glass-based glaze end seal, according to the present invention. Porous ceramic tube 10 has a continuous, gas impermeable end seal 12 disposed on at least one of its ends. End seal 12 covers a length=L of the outer surface 16 of tube 10 and the end 14 of tube 10, but does not cover the inner surface 18 of tube 10. The inner surface 18 of tube 10 has a microporous separation membrane 20 extending to the end 14 of tube 10. Microporous separation membrane 20 can be an inorganic zeolite-based membrane.

Figure 3:
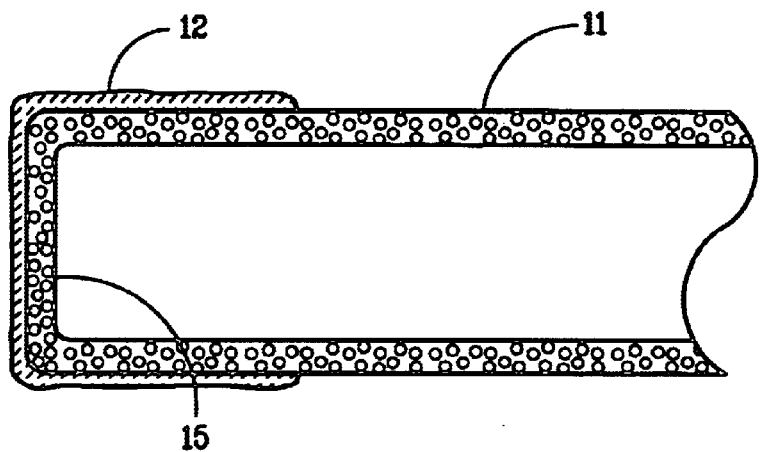
FIG. 3 illustrates a schematic cross-section view of another example of a porous ceramic tube with a glass-based glaze end seal, according to the present invention.

FIG. 3 illustrates a schematic cross-section view of another example of a porous ceramic tube with a glass-based glaze end seal, according to the present invention. Porous ceramic tube 11 has a closed end 15, with a continuous, gas impermeable end seal 12 covering the outer surface of closed end 15.

Figure 4:
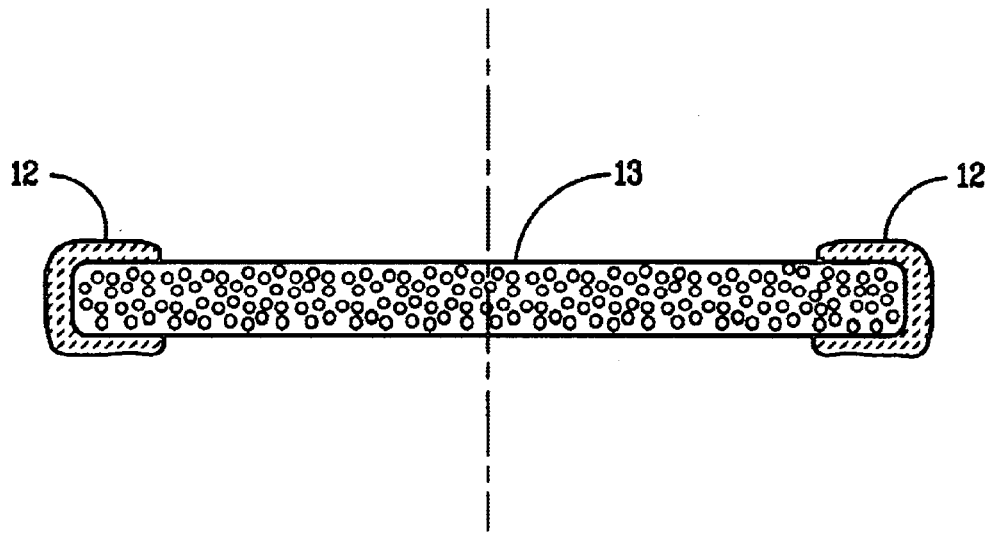
FIG. 4 illustrates a schematic cross-section view of another example of a porous axisymmetric ceramic body with a glass-based glaze end seal, according to the present invention.

FIG. 4 illustrates a schematic cross-section view of another example of an axisymmetric porous ceramic body with a glass-based glaze edge seal, according to the present invention. Axisymmetric porous ceramic disc 13 has a continuous, gas impermeable edge seal 12 covering the outer circumference of disc 13.

Figure 5:
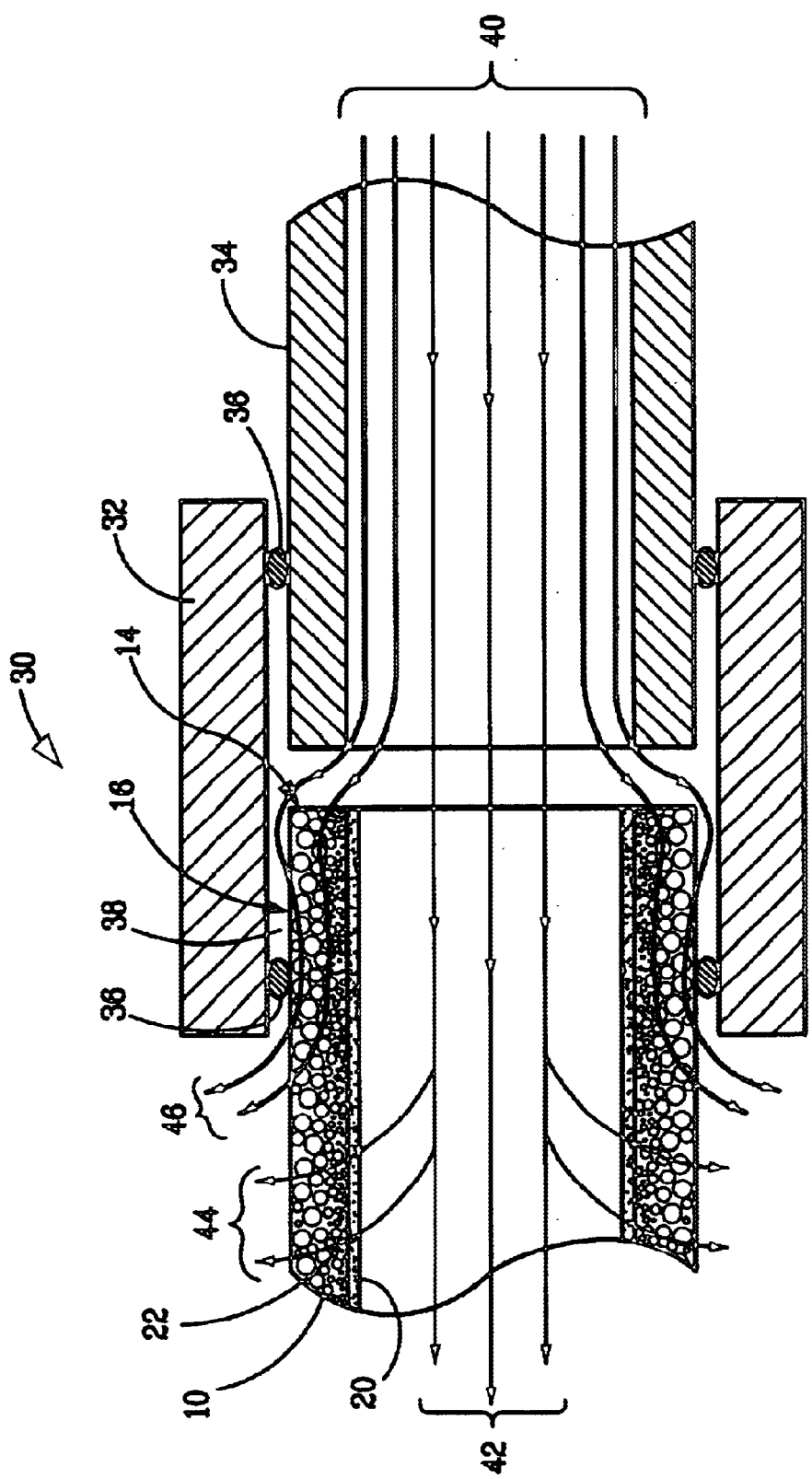
FIG. 5 illustrates a schematic cross-section view of a gas separation assembly including a porous ceramic tube with a microporous separation membrane, coupled to a feed tube by a union coupling.

FIG. 5 illustrates a schematic cross-section view of a gas separation assembly including a porous ceramic tube with a microporous separation membrane, coupled to a feed tube by a union coupling. Gas separation assembly 30 does not have a gas impermeable end seal. Gas separation assembly 30 is part of a larger gas separation system (not shown) that provides a means for separating a feed stream 40 of feed gas (i.e., feedstock) into a filtrate (e.g., permeate) stream 44 comprising relatively small components (small molecules, atoms, etc.) and an exit gas stream 42 comprising relatively large components (large molecules, hydrocarbon isomers, etc.). Feed gas 40 is carried within tube 34, which is coupled to porous ceramic tube 10 by a union coupling 32. Tube 10 can have a microporous separation membrane 20 disposed on its inner surface. Small fractions 44 of feed gas 40 freely pass through the porous wall of tube 10 (i.e., the filter), while the large fractions 42 are blocked and, hence, exit the outlet end of tube 10.

In FIG. 5, leakage gas stream 46 can pass through the open (unsealed) porous end 14 of tube 10 and exit the surface 16 of tube 10 without having to pass through microporous separation membrane 20. Alternatively, leakage gas stream 46 can flow into the plenum region 38 located in-between the outside of tube 10 and the inside of union coupling 32, then flow into the outer surface 16, around the seal ring 36 through the connected porosity of tube 10, and exiting back out through surface 16 on the far side of seal ring 36, also creating a leakage path. In both cases, the lack of a gas impermeable end seal allows leakage gas 46 to bypass flowing through microporous separation membrane 20, which degrades the overall efficiency of the separation process. FIG. 5 illustrates an example where the size of pores 22 in porous ceramic tube 10 varies in the radial direction across the thickness of the wall of tube 10, i.e., from smaller diameter pores 22 near the inner diameter of tube 10 to larger diameter pores 22 near the outer diameter of tube 10.

Figure 6:
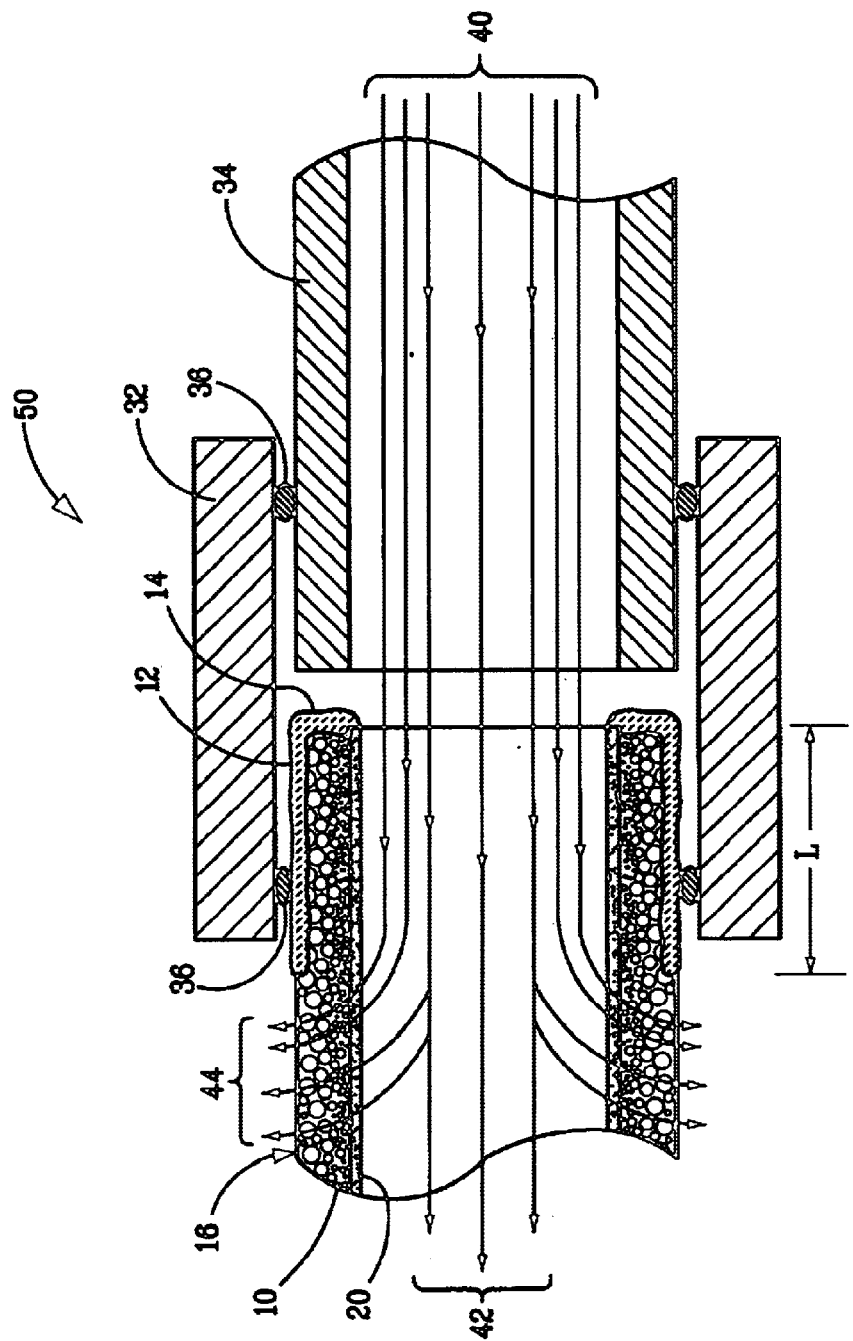
FIG. 6 illustrates a schematic cross-section view of an example of a gas separation assembly including a porous ceramic tube with a microporous separation membrane and a glass-based glaze end seal, coupled to a feed tube by a union coupling, according to the present invention.

FIG. 6 illustrates a schematic cross-section view of an example of a gas separation assembly 50 including a porous ceramic tube 10 with a microporous separation membrane 20 and a glass-based glaze end seal 12 coupled to a feed tube 34 by a union coupling 32, according to the present invention. In this example, porous ceramic tube 10 has a gas impermeable end seal 12 coating the end 14 of tube 10 and a portion (L) of the outer surface 16 of tube 10. End seal 12 serves to prevent leakage of any gas through the end 14 of tube 10, or through the outer surface 16; effectively preventing any gas from bypassing microporous separation membrane 20. End seal 12 is free of any materials that comprise the microporous separation membrane 20, therefore providing a smooth surface for compressing seal ring 36 onto. End seal 12 can also provide additional strength to the porous ceramic tube 10 to resist the compressive force of seal ring 36 applied by coupling 32.

Seal ring 36 can comprise a rubber O-ring, or a compliant polymer, such as silicone, for low temperature use. Alternatively, coupling 32 can be joined to end seal 12 with an epoxy adhesive. For high temperature use, seal ring 36 can comprise one or more soft metallic ferrules or gaskets (e.g. annealed copper, gold, silver, etc.) and coupling 32 can comprise a plurality of threaded metallic members that provide a strong compression force on these ferrules for sealing against the outer surface of end seal 12 and tube 34 (e.g., Swagelock™ fittings). Alternatively, coupling 32 can be soldered or brazed onto end seal 12.

End seal 12 comprises a thin, non-porous, crack-free glass film that is able to partially fill in the large exterior pores of tube 10. The glass film withstands traditional hydrothermal reaction conditions used for growing crystalline inorganic phases (e.g., for membrane 20). Tube 10 can be made of an alumina material. The glass composition used for end seal 12 is chosen so its coefficient of thermal expansion matches that of alumina. This eliminates cracking in the glass coating, or splaying of the alumina.

An example of a glass composition that meets these criteria is Corning, Inc. Glass Code 7052. This is an alkali barium borosilicate glass having a softening point of 712 C, an annealing point of 484 C, a strain point of 440 C, and Coefficient of Thermal Expansion of $47 \times 10^{-6}$ $C^{-1}$ from 0 to 300 C, and a density of 2.27 g/cc. A principle commercial use for 7052 glass is for sealing to Kovar. This glass is available in crushed and powdered forms, and in standard US mesh sized from 4 through 325. Preferably, the glass particle size is less than 100 microns, and more preferably less than 50 microns. This glass may have $Na_2O$, $K_2O$, or $CaO$ in its composition. Other glass compositions that match the CTE of alumina can be used.

The glass is fused to alumina tube 10 at a sufficiently high temperature and appropriate time to close any pinholes in the glass, and to allow the glass to penetrate the porous alumina slightly (as shown in FIG. 6). Care must be taken not to heat at too high a temperature, or for too long a time, or the glass will sorb too much of the alumina into solution and possibly change the coefficient of thermal expansion of the glass.

The glass composition for end seal 12 is chosen so that the glass is stable to subsequent hydrothermal and thermal processing, and does not poison any of the controlled pore thin film processes. The glass is applied as a powder from a glass+solvent suspension. The amount of glass applied to the alumina tube is controlled by the ratio of glass powder to solvent. The solvent chosen can effect the uniformity of the fired glass film. A uniformly thick film for end seal 12 is required for achieving a high quality hermetic seal with coupling 32 and seal 36. A clean, dry alumina tube is dipped into the glass+solvent suspension to a depth sufficient to cover the required length, L, of the outside of tube 10.

The dipping process is similar to slip casting of ceramics. The porous alumina tube sucks the solvent from the glass+solvent suspension. Glass particles are carried to the surface of the alumina tube and stick to the tube when it is withdrawn. The glass particles are loosely bound to each other electrostatically.

The solvent in the pores of the tube and between the glass particles is removed by drying. The tube is then heated to a sufficiently high temperature and for the correct length of time to cause the glass particles to fuse together and flow into the pores of the alumina tube. This can be done in an atmosphere of nitrogen, argon, or even air. Any large pore area of the alumina tube that has been in contact with the glass+solvent slurry will be coated with glass particles because the pores will suck out the solvent in the slurry. As the solvent is drawn inside the outer pores by capillary forces, the viscosity of the glass+solvent coating increases, thereby improving the stability of the glass+solvent coating prior to furnace firing.

The solvent can be chosen from amyl acetate and Fluorinert™. Fluorinert™ is a trademarked family of products manufactured by 3M Inc., and refers to a family of perfluorocarbon fluids that are routinely used as heat transfer media in a variety of industries, including refrigeration, electronics, semiconductor manufacturing and testing, fuel cells, pharmaceutical, chemical, and other industries. Fluorinert™ fluids have a fully fluorinated structure, and are clear, colorless, odorless, and non-flammable. The family of Fluorinert™ fluids has high density, high dielectric strength, low viscosity, low pour point, and a low surface tension. Boiling points range from 30 C to 215 C and pour points range from −25 C to −101 C, depending on the specific composition.

Examples of the process for making the glass seal are as follows:

EXAMPLE #1

1. Mix 25 grams of Corning 7052 glass powder in 50 mls of amyl acetate.
2. Ultrasonically mix until smooth.
3. Dip porous alumina tube (0.4 inch diameter) to desired depth for a few seconds and withdraw. Turn tube around and dip other end. The solution is good for 2 tube coatings (a total of 4 dips) before the solution should be remixed ultrasonically.
4. Dry under heat lamp for about 1 hour to evaporate solvent.
5. Fire the coated tube in a furnace with atmospheric nitrogen to fuse glass particles. Ramp up to 1000 C at a rate of 5 degrees C/minute. Then, hold at 1000 C for 15 minutes. Then, cool at 15 degrees C/minute to room temperature. Hold tube in center when fusing the glass powder.

EXAMPLE #2

1. Mix 20 grams of Corning 7052 glass powder in 60 mls of Fluorinert™.
2. Ultrasonically mix until smooth.
3. Dip porous alumina tube (0.4 inch diameter) to desired depth for a few seconds and withdraw. Turn tube around and dip other end. The solution is good for 2 tube coatings (a total of 4 dips) before the solution should be remixed ultrasonically.
4. Dry under heat lamp for about 1 hour to evaporate solvent.
5. Fire the coated tube in a furnace with atmospheric nitrogen to fuse glass particles. Ramp up to 1000 C at a rate of 5 degrees C/minute. Then, hold at 1000 C for 15 minutes. Then, cool at 15 degrees C/minute to room temperature. Hold tube in center when fusing the glass powder.

Glass end seals prepared by the processes of Example's 1 and 2 were found to be hermetically tight after being mounted in Swagelock™ metal compression fittings and heat treated.

In both examples, the gamma-alumina tubes were baked at 100 C in air for two hours prior to coating to dry them. The mixture of glass+Fluorinert does not appear to be as homogeneous or colloidal as the amyl acetate mixture, even with ultrasonic mixing help. The coating appears more uniform with the amyl acetate also. The Fluorinert, however, is easier to mix but the Fluorinert also evaporates more quickly and the coating may be affected more by the temperature of the alumina tubes when they are coated. The high density (1.8–1.9 g/cc) of Fluorinert serves to suspend the glass particles in the slurry. The higher the density of solvent, the slower the settling of the glass particles (density=2.28 g/cc). Two types of Fluorinert were used that have the highest densities in the family of Fluorinert fluids: FC-42 (1.9 g/cc) and FC-77 (1.8 g/cc).

The nonpermeable glass-based glaze produced by using these processes has the following characteristics: (1) high temperature stability, (2) direct application to the porous ceramic substrate, (3) no interference with thin film growth (e.g., zeolite films), and (4) mechanical stability (necessary for tightening of ends into Swagelok™ fittings). The thickness of glass films made by this process are in the range of 0.001–0.005 inches, and most commonly 0.0025 inches.

Glass powder deposited inside of a porous ceramic tube can be removed prior to firing by drying the solvent and then blowing into the end of the tube to dislodge the loosely adhered glass particles.

Methods, other than dipping by hand, for coating a porous ceramic surface with a suspension or slurry of glass particles suspended in a solvent can be used, including: brushing, spraying, spin coating, vacuum pulling, and slip casting. Solvents other than amyl acetate or Fluorinert fluids can be used, such as alcohol, ethanol, propanol, etc. that don't leave any residual contaminants or organics after evaporating.

Application of the glass-based glaze of the present invention to porous ceramic surfaces can be used to create a vacuum-sealed surface on part, or all, of the surface area of the ceramic part. The glass-based glaze of the present invention can also be used to provide a gas impermeable seal on porous sintered KOVAR metal substrates. In principle, the glass-based glaze can be applied to any material that is wet by the molten glass.

The particular examples discussed above are cited to illustrate particular embodiments of the invention. Other applications and embodiments of the apparatus and method of the present invention will become evident to those skilled in the art.

The actual scope of the invention is defined by the claims appended hereto.

What is claimed is:

1. A microporous, inorganic thin film membrane disposed on the inner surface of a porous alumina tube, wherein the tube comprises at least one gas impermeable end seal, wherein the end seal comprises a borosilicate glass formulated to have a coefficient of thermal expansion that matches the coefficient of thermal expansion of alumina.

2. The article of claim 1, wherein the borosilicate glass comprises 7052 glass manufactured by Corning Inc.

3. A process for sealing the surface of a porous ceramic body with a thin, gas impermeable, glass glaze, comprising:

a) mixing glass particles with a solvent to make a smooth slurry; wherein the glass particles are suspended in the slurry;

b) depositing a thin layer of the slurry on the surface of the porous ceramic body;

c) removing the solvent by drying with heat; and d) firing the coated body at a temperature sufficient to melt and fuse the glass particles together to make a continuous, pinhole free, gas impermeable glaze that seals the surface of the porous ceramic body, wherein the glaze does not contain $Na_2O$, $K_2O$, $PbO$ or $CaO$ low melting point oxides.

4. The process of claim 3, wherein the fused glass has a coefficient of thermal expansion that matches the thermal expansion coefficient of the porous ceramic body.

5. The process of claim 4, wherein the glass comprises an alkali barium borosilicate glass.

6. The process of claim 5, wherein the glass comprises 7052 glass made by Corning Inc.

7. The process of claim 3, wherein the glass particles are smaller than 100 microns.

8. The process of claim 7, wherein the glass particles are smaller than 50 microns.

9. The process of claim 3, wherein the solvent comprises any solvent that does not leave a residual contaminant after drying.

10. The process of claim 9, wherein the solvent comprises a fluid selected from the group consisting of alcohol, ethanol, propanol, amyl acetate, and a perfluorocarbon fluid.

11. The process of claim 3, comprising ultrasonically mixing the glass particles with the solvent to make the smooth slurry.

12. The process of claim 3, wherein said slurry comprises a mixture of 25 grams of Corning 7052 glass powder and 50 mls of amyl acetate.

13. The process of claim 3, the slurry is deposited using a method selected from the group consisting of dipping, brushing, spraying, spin coating, vacuum pulling, and slip casting.

14. The process of claim 3, wherein removing the solvent by drying with heat comprises drying the coated body under a heat lamp for about 1 hour.

15. The process of claim 3, wherein firing the coated body comprises heating to body to 1000 C. in a furnace with atmospheric nitrogen and holding for 15 minutes.

16. The process of claim 15, further comprising ramping up the body's temperature at a rate of 5 degrees C. per minute.

17. The process of claim 15, further comprising cooling down the body's temperature at a rate of 15 degrees C. per minute.

18. The process of claim 3, wherein the porous ceramic comprises porous alumina.

19. The process of claim 18, wherein the porous alumina body comprises a porous alumina tube.

20. The process of claim 19, wherein the porous alumina tube comprises an inorganic microporous thin film separation membrane disposed on the inner surface of the tube.

21. The process of claim 20, wherein the inorganic thin film separation membrane comprises a zeolite material.

22. The process of claim 20, further comprising depositing the inorganic microporous thin film separation membrane on the tube's inner surface after the glass particles have been fired in step d).

23. The process of claim 18, wherein the firing temperature is sufficiently high that at least some of the alumina is sorbed into the glass during firing.

24. The process of claim 3, wherein the porous ceramic body comprises a porous ceramic disk, and further wherein the glass glaze is deposited on the outer periphery of the disk.

25. A porous ceramic body comprising a thin, gas impermeable, glass glaze disposed on the body's surface by the process of claim 3.

26. The glaze of claim 25, wherein the thickness of the glass is in-between 0.001 and 0.005 inches.

27. The glaze of claim 26, wherein the thickness of the glass is approximately 0.0025 inches.

28. A microporous, inorganic thin film membrane disposed on the inner surface of a porous alumina tube, wherein the tube comprises at least one gas impermeable end seal fabricated on the tube by the process of claim 3.

* * * * *